April 3, 1928.
E. B. JOHNSON
ANTISKID CHAIN FOR AUTOMOBILES
Filed March 11, 1927
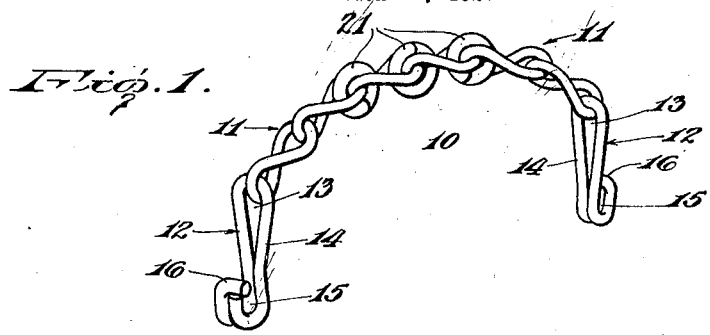
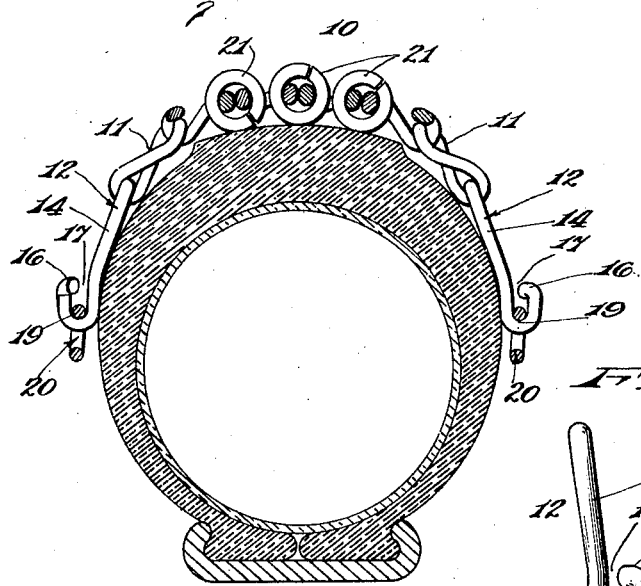
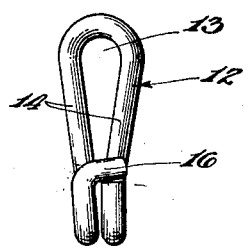
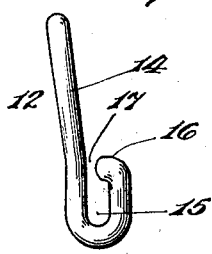
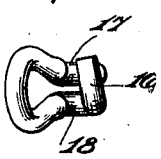
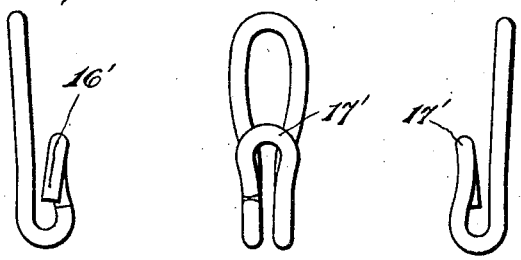
Earl B. Johnson
INVENTOR
BY Victor J. Evans
ATTORNEY
WITNESS:

Patented Apr. 3, 1928.

1,665,098

UNITED STATES PATENT OFFICE.

EARL B. JOHNSON, OF HARTSDALE, NEW YORK.

ANTISKID CHAIN FOR AUTOMOBILES.

Application filed March 11, 1927. Serial No. 174,579.

This invention relates to improvements in anti-skid chains for automobiles.

The primary object of the invention resides in a simple means of detachably connecting the cross chain of an anti-skid chain to the annular chains thereof, so that the cross chains may be replaced when worn by one unskilled in the art and without the use of tools.

Another object of the invention is to provide an anti-skid chain in which the tread surface of the chain will withstand considerably more wear than the present construction of chains, thereby prolonging the life of the chain, as it will be appreciated that the cross chains often wear out before the annular attaching chains.

A further object of the invention is the provision of a novel form of self adjusting fastener carried by the ends of the cross chains and which may be snapped into locking engagement with the links of the annular chain, or disengaged therefrom as the occasion demands, and when engaged, the same is automatically locked against accidental disengagement.

A still further object is to provide a cross chain for anti-skid chains in which the joined ends of certain of the links serve as a support for turnably receiving a plurality of wear elements adapted to engage the ground when the device is applied to the tire of an automobile.

With these and other objects in view, the invention resides in certain novel construction and combination and arrangement of parts, the essential features of which are hereinafter fully described, are particularly pointed out in the appended claim, and are illustrated in the accompanying drawing, in which:—

Figure 1 is a perspective view of my improved cross chain for anti-skid chains.

Figure 2 is a vertical sectional view through a tire showing an anti-skid chain embodying my invention.

Figure 3 is a front elevation of one of the connecting elements.

Figure 4 is an end elevation of the same.

Figure 5 is a top plan view thereof.

Figures 6, 7 and 8 are elevational views of a modified form of connecting link.

Referring more particularly to the drawing, the reference numeral 10 designates my improved cross chain in its entirety which includes a length of chain constructed of a plurality of twisted links 11 of the usual well-known construction. Connected to the end links of the cross chain are fastening or attaching elements 12 of a construction now to be described.

Each connecting element 12 comprises a single length of resilient material bent approximately midway between its ends to provide an enclosed eye 13 to which one end of the link of the cross chain is connected. The material is bent to provide converging legs 14 while the free ends are bent upon the legs to provide a hook 15. One of the free ends is longer than the other end and is bent annularly toward the other free end to provide a locking finger 16. The finger 16 extends inwardly toward the legs to provide a restricted portion 17 and an enlarged mouth portion 18 at the entrance to the hook. The space between the end of the finger and the adjacent leg is slightly smaller than the thickness of the link 19 of the annular chain 20 to which the cross chain is connected.

In effecting the connection of the cross chain 10 with the annular chains 20, the links 19 of the annular chain are first inserted into the enlarged mouth portion 18 and pressure applied to the connecting element 12 to force the link 19 past the restricted portion 17. As the link 19 is forced into the restricted portion, the finger 16 yields, thus permitting the link to engage the hook where it will be locked by reason of the finger 16 which snaps back to normal position after the passage of the link therethrough. The cross chain is now locked to the annular chains and cannot accidentally become separated therefrom. The fastener or connecting element 12 may be termed self adjusting in that the finger 16 yields during the insertion or removal of a link and always returns to normal position. Furthermore, twisting of the links of the cross chain in one direction during travel of a wheel over the ground will tend to cause the finger to further restrict the entrance to the hook portion. Should it be desired to remove the cross chain when worn, the links of the annular chain are first moved into the enlarged mouth portion and due to the angularity of the finger 16, the link wedges the finger in an outward direction to expand the restricted portion to permit of the removal of the link from the hook.

For prolonging the life of the cross chain, I provide wear elements on the tread portion of the chain and which are in the form of rings 21. The inner diameters of the rings are such as to permit of the passage to the connecting ends of the links of the cross chain to freely pass therethrough. The outer diameters of the rings extend beyond the plane of the links to engage the ground as the tire to which the chain is connected passes thereover. The links of the chain will remain spaced from the ground until the same become worn down to a plane even with the links. The connecting ends of the links serve as pivots for the respective rings and as the wheel of the vehicle rotates, the position of the rings will automatically change so that the same will wear evenly about its periphery during the life of the rings. However, should the rings wear through and drop off, the links of the cross chain will then begin their life but the user of the chain has had considerable wear from the rings up until this time. It will therefore be appreciated that a cross chain of this construction will withstand considerably more wear than the present type of the cross chain without materially increasing the cost of production.

By the use of my improved connecting elements 12, a person unskilled in mechanics and without the aid of tools may replace a worn out cross chain with a new one.

In Figures 6, 7 and 8, I have shown a modified form of connecting element which is constructed identically to that shown in the preferred form with the exception that instead of bending the finger 16 at an angle, the said finger is bent inwardly as at 16' from a loop 17', which loop is formed on one of the free ends of the material from which the member is constructed. The operation of this form of element is identical to that already described, as the formation of the finger 16 provides an enlarged mouth portion and a restricted portion.

What is claimed as new is:—

A self adjusting fastening element comprising a single length of yieldable material bent approximately midway between the ends to provide an eye, the free ends of said material converging towards each other and being bent upon themselves to provide a hook, one of the free ends being longer than the other to extend over and inward of the same and bent at an angle with respect to the other to provide an inwardly extending yieldable finger for normally restricting the entrance to the mouth of said hook.

In testimony whereof I have affixed my signature.

EARL B. JOHNSON.